United States Patent [19]

Senecal et al.

[11] Patent Number: 4,777,031

[45] Date of Patent: Oct. 11, 1988

[54] HIGH TEMPERATURE PROCESS FOR MAKING FINE MAGNETIC PARTICLES

[75] Inventors: Joseph A. Senecal; Steven R. Reznek, both of Wellesley; Matthew Neville, Boston; Kenneth C. Koehlert, Medford; Todd R. Gattuso, Boston, all of Mass.

[73] Assignee: Cadot Corporation, Boston, Mass.

[21] Appl. No.: 885,345

[22] Filed: Jul. 14, 1986

[51] Int. Cl.$^4$ .............. C01G 49/02; C04B 32/26
[52] U.S. Cl. .................. 423/632; 252/62.58; 252/62.63; 423/634; 423/594
[58] Field of Search ............ 423/632, 634, 594; 252/62.58, 62.63

[56] References Cited

U.S. PATENT DOCUMENTS

| 379,872 | 4/1943 | Ebner | 423/1 |
|---|---|---|---|
| 2,155,119 | 4/1939 | Ebner | 23/1 |
| 2,950,955 | 8/1960 | Wagner | 23/200 |
| 3,378,335 | 4/1968 | Ellis et al. | 23/51 |
| 4,336,242 | 6/1982 | Schmidberger et al. | 423/594 |

FOREIGN PATENT DOCUMENTS

| 56-149330 | 11/1981 | Japan . |
|---|---|---|
| 793700 | 3/1956 | United Kingdom . |
| 888688 | 5/1958 | United Kingdom . |

OTHER PUBLICATIONS

"Ultrafine Metal Oxides by Decomposition of Salts in A Flane", Nielsen et al., *Proceeding of the Electrochemical Society Symposium—Ultrafine Particles,* May 3, 1961, pp. 181-195.

"Fine Grained Ferrites I. Nickel Ferrite", Malino Fsky et al., *Journal of Applied Physics,* Supplement to vol. 32, No. 3, Mar. 1961, pp. 237s-238s.

"Spray Roasted Iron Oxide for the Production of Ferrites", Ruthner et al., *Ferrite-Proc. of Int'l. Conference,* Kyoto, Japan, 1970.

"Fast Reaction Sintering Process for the Production of Ferrites", Ruthner, *Journal de Physique,* Colloque C1, Supplement No. 4, Apr., 1977, pp. C1-311 to C1-315.

"Preparation of Ferrites by the Atomizing Burner Technique", Wenckus et al., *Conference on Magnetism and Magnetic Materials,* (IEEE) Publication T-91 (1957), pp. 526-530.

"Sintering of Ferrite Powder Prepared by a New Spray-Roasting Technique", Akashi et al., *Sintering and Related Phenomena-Proceedings of International Conference,* Jun. 1965, pp. 747-758.

*Primary Examiner*—Patrick P. Garvin
*Assistant Examiner*—George R. Fourson
*Attorney, Agent, or Firm*—Gaston & Snow

[57] ABSTRACT

The present invention is a method of producing single, unaggregated magnetic iron oxide particles. An iron or iron and divalent metal halide feed solution is kinetically atomized into a high velocity flame. The feed solution is vaporized and held in a reactor at a temperature and partial pressure of an oxidizing phase sufficient to form either ferrous oxide or magnetite particles. The iron or iron and divalent metal halide vapor reacts with the oxidizing phase vapor and converts to either ferrous oxide vapor or magnetite vapor. Since the vapor phase is beyond equilibrium concentration ferrous oxide or magnetite particles precipitate from the vapor phase. Quenching of the magnetite particles at an enhanced rate to less than 500° C. in a reducing atmosphere renders magnetite and in a oxidizing atmosphere renders maghemite. Quenching of the ferrous oxide particles in a non-oxidizing atmosphere produces magnetite particles.

18 Claims, 2 Drawing Sheets

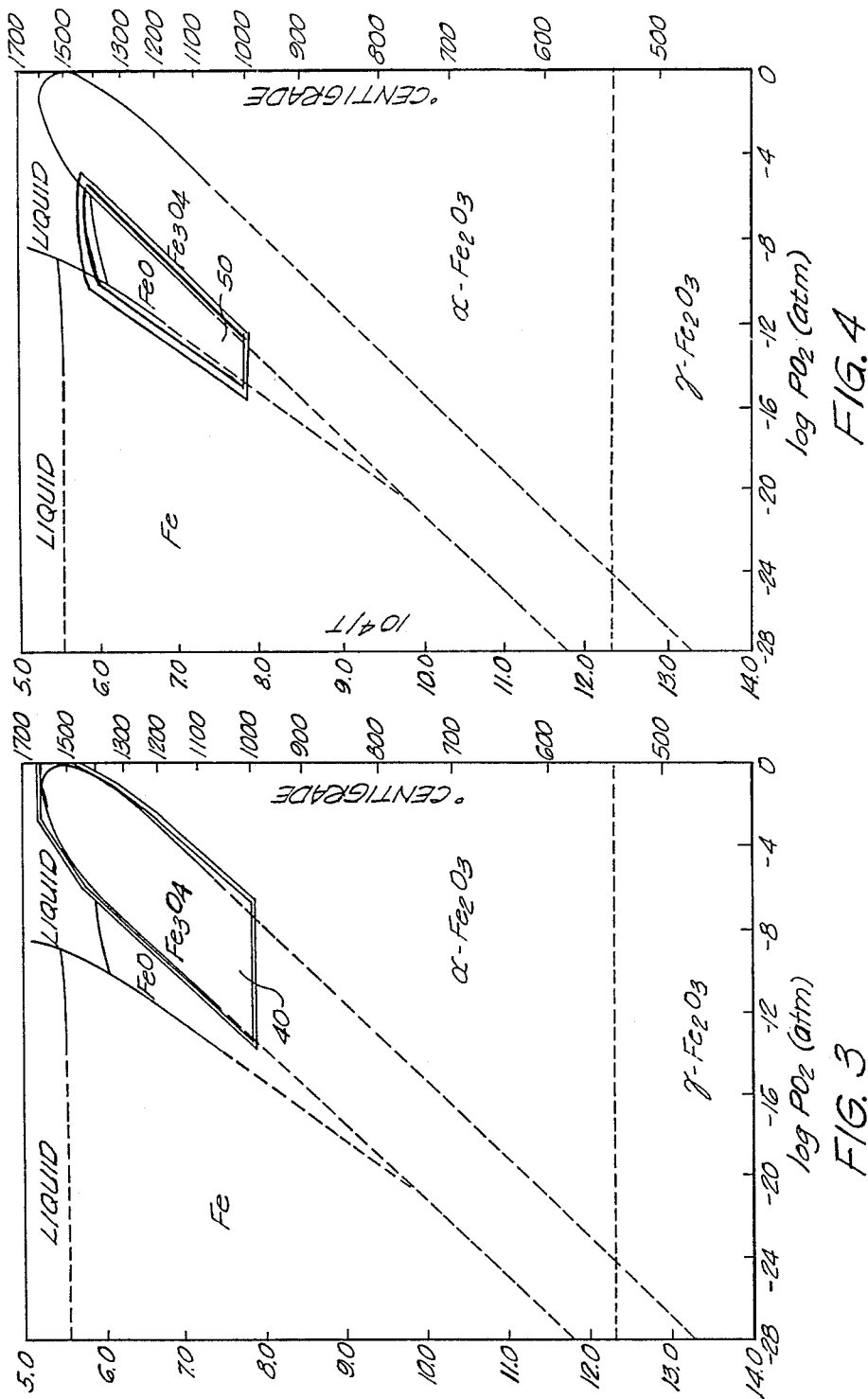

HIGH TEMPERATURE PROCESS FOR MAKING FINE MAGNETIC PARTICLES

FIELD OF INVENTION

This invention relates to a process for making fine magnetic particles and, more particularly, relates to a high temperature process for converting iron or iron and divalent metal halide salt solutions into fine magnetic iron oxide or doped magnetic iron oxide particles.

BACKGROUND STATEMENT OF THE ART

Converting iron salt solutions into iron oxides by high temperature hydrolysis is well known in the art. In many of the usual embodiments as disclosed in U.S. Pat. No. 379,872, U.S. Pat. No. 2,155,119 and British Patent No. 793,700, the sole object of the invention is simply to produce an oxide particle without regard to controlling either size, shape or crystal phase. In these processes, cost is minimized by introducing large salt droplets into relatively low temperature gases. Since the particle size of the oxides is dependent upon droplet size, the iron oxide particles produced are also large. The large particle size, however, adversely effects the magnetic properties, specifically coercivity.

In order to overcome these limitations, several attempts have been made to use high temperature reactors to produce fine magnetic oxide particles. At least three publications, "Sintering of Ferrite Powder Prepared by a New Spray-Roasting Technique", *Sintering and Related Phenomena—Proceedings of International Conference,* June 1965, pp. 947–58; "Preparation of Ferrites by the Atomizing Burner Technique", *Conference on Magnetism and Magnetic Materials,* (IEEE) Publication T-91 (1957) pp. 526–530; and "Fine-Grained Ferrites, I. Nickel Ferrite", *Journal of Applied Physics,* Supplement to Volume 32, No. 3, March 1961, pp. 237s–238s, teach the formation of metal oxides by decomposing metal precursor solutions in a flame environment. Although oxide particles are indeed produced by these thermal decomposition processes, the particles which form are not single, equiaxed solids but, rather, aggregates of hollow cenospheres which lack attractive magnetic properties. The morphological characteristics of these oxides clearly indicate that the feed solutions utilized were introduced into the reactor at too low a temperature and that the droplets utilized were much too large.

A method of converting nickel chloride or zinc chloride solutions into nickel ferrite or zinc ferrite particles by decomposing metal salt droplets in a counter-current gas stream was taught in U.S. Pat. No. 3,378,335. This process is limited, however, since it will only produce magnetic phases if the mole ratio of nickel or zinc to iron is one to two. Moreover, the average droplet size of the feed solution was large, ranging between 50 and 200 microns, such that the low temperature decomposition of the large droplets again failed to produce fine, unaggregated, single phase oxide particles.

The manufacture of extremely fine magnetic ferric oxide powders by hydrolyzing iron chloride at elevated temperatures was taught in U.S. Pat. No. 2,950,955 and Japanese Patent Application No. 56-149330. The iron chloride introduced into the reactor is in a vapor state rather than a liquid state and is formed by either subli- mating an anhydrous material or by contacting a chlorine gas with an iron element. Needless to say, by vaporizing the iron chloride prior to its introduction into the reactor, the process of forming fine particle oxides becomes inherently complex and expensive.

In a publication entitled "Ultrafine Metal Oxides by Decomposition of Salts in a Flame", *Proceeding of the Electrochemical Society Symposium—Ultrafine Particles,* May 3, 1961, pp. 181–195, the authors describe a method for making magnetic oxide powders from ferrous chloride solutions. Ferrous chloride is first converted to ferrous oxide which subsequently oxidizes to magnetite. The magnetite in turn oxidizes to gamma ferric oxide. Since gamma ferric oxide is metastable and will convert to alpha ferric oxide at temperatures above 550° C., the hot gamma ferric oxide particles are cooled before the gamma ferric oxide can convert to the equilibrium phase. The undesirable feature of this process, obviously, is that the particles may reach temperatures above 550° C. for only very short time periods.

SUMMARY OF THE INVENTION

The present invention is an improved method for making fine magnetic oxide and doped magnetic oxide particles in a high temperature reactor. In one important embodiment of the invention, an iron halide feed solution is atomized by a high velocity flame which has been heated to a temperature sufficient to effect vaporization of the iron halide salt. The feed solution is then evaporated into a vapor phase consisting of an iron halide salt vapor and oxidizing or hydrolyzing gases which, depending upon the composition of the solvent, consist of either air, oxygen, steam or mixtures thereof. The entire vapor phase is then held in a reactor at a range of combinations of temperatures and oxygen partial pressures which are sufficient to effect formation of magnetite yet avoid formation of alpha ferric oxide. Under these temperature and pressure parameters, the iron halide vapor reacts with the oxidizing or hydrolyzing vapor and converts to iron oxide vapor. Since the iron oxide vapor is greater than its equilibrium concentration, oxide particles of the magnetite crystal structure precipitate. The particle size of the magnetite precipitates is controllable by limiting the residence time of the vapor in the reactor and by varying the relative concentration of oxide particles per unit volume of the vapor phase. In the preferred embodiment, the residence time in the reactor is in the range of 5 to 200 milliseconds so that particles between 0.02 and 0.2 microns are produced. The magnetite particles are then quenched to temperatures less than 500° C. in an oxidizing atmosphere if the desired product is maghemite (i.e., gamma ferric oxide) or in a reducing atmosphere if the desired product is magnetite.

In another important embodiment of the invention, a divalent metal halide solution is combined with the iron halide feed solution prior to atomization into the flame. The entire feed solution vaporizes and is held in the reactor at a temperature and oxygen partial pressure sufficient to effect formation of magnetite yet avoid formation of alpha ferric oxide. The iron and divalent metal halide vapor phase reacts with the hydrolyzing or oxidizing phase and is converted to a metal oxide vapor phase. At the pressures and temperatures of the present invention as described above, the oxide vapors are substantially beyond their equilibrium concentration such that iron and divalent metal oxide particles precipitate from the vapor phase. Particle size of the iron and divalent metal oxides is again controllable by limiting the residence time of the vapor phase in the reactor to between 5 and 200 milliseconds. Quenching the iron and divalent metal oxides to temperatures less than 500° C. in either a reducing or oxidizing atmosphere produces the desired doped magnetite or maghemite particles, respectively.

Accordingly, it is a primary object of the present invention to provide a process using high temperature reactors for converting solutions of metal halide salts into fine particle metal magnetic oxides.

It is another object of the present invention to provide a method which produces individual, equiaxed and unaggregated magnetic oxide particle which are well suited for dispersion in binder systems such as that used in magnetic recording media.

It is another object of the present invention to provide a method in which the particle size, surface area, shape and crystal phase of the fine magnetic oxides is easily controllable.

It is another object of the present invention to provide a simple method for making fine magnetic particles which involves few process steps and short reactor residence times.

It is another object of the present invention to provide a method for producing fine magnetic oxide particles which minimizes the formation of non-magnetic metal oxide phases.

It is a still further object of the present invention to provide an inexpensive method for producing high yields of fine magnetic oxide particles.

BRIEF DESCRIPTION OF THE DRAWINGS

These and other details and advantages of the invention will be described in connection with the accompanying drawings in which:

FIG. 3 is an extrapolated iron phase diagram indicating the regime of reactor temperatures and partial pressures of the hydrolyzing or oxidizing gases which are sufficient to effect precipitation of particles with a magnetite crystal structure; and FIG. 4 is an extrapolated iron phase diagram which indicates the combination of temperatures and partial pressures of the hydrolyzing or oxidizing gases which are sufficient to effect precipitation of particles from the vapor phase having a ferrous oxide crystal structure.

DESCRIPTION OF THE PREFERRED EMBODIMENT

At the outset, the invention is described in its broadest overall aspects with a more detailed description following. The present invention s a method for producing fine magnetic particles of iron oxide in a high temperature reactor. The iron oxide particles are single, unaggregated equiaxed crystals having the chemical composition of $(Me^{++}O)_xFe_2O_3$ or $(Me^{++}{}_xFe^{++}{}_{1-x}O)Fe_2O_3$ where x has a mole fraction value greater than or equal to zero and less than 1 and $Me^{++}$ is any divalent ion whose halide salt can be converted to an oxide in a high temperature steam or oxygen atmosphere. The desired crystal phase of the fine magnetic iron oxide crystal is either magnetite ($Fe_3O_4$) or maghemite (gamma $Fe_2O_3$). The formation of alpha and beta ferric oxide is actively avoided since both of these phases are non-magnetic and, therefore, constitute undesirable contaminants of the maghemite and magnetite crystal phases.

When x is greater than zero, the iron oxide particle is doped with a divalent metal ion such as cobalt, magnesium, cadmium, or nickel in order to modify the iron oxide particle's magnetic properties. The doping of magnetite or maghemite with cobalt oxide, for example, will increase the coercivity and remanent magnetization of the iron oxide particle. A magnetite or maghemite particle doped with cobalt oxide is particularly well suited for dispersion in a binder, such as that used in magnetic coatings for recording media. The magnetic properties (i.e. coercivity and remanence) of the dispersion will not depend upon, nor be affected by, the orientation of the individual doped oxide particles and, therefore, the pattern of magnetization may have high remanent components both parallel and perpendicular to the plane of the coating.

Figure 1:
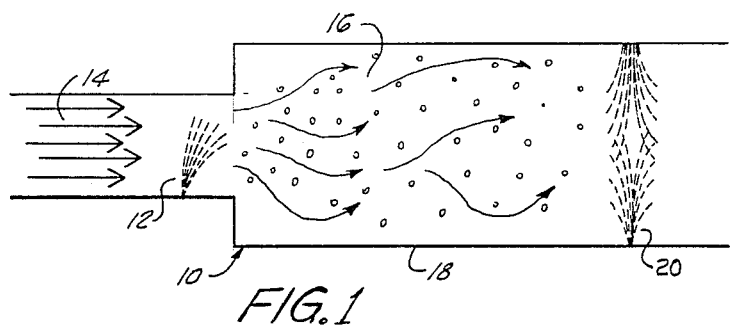
FIG. 1 is a schematic view of the preferred method for producing fine particle magnetic oxides according to the present invention.

In the preferred embodiment 10 of the present invention, an iron and divalent metal halide feed solution 12 is kinetically atomized with a high temperature, high velocity flame 14 as illustrated in FIG. 1. The feed solution is preferably formed by dissolving iron and other metal halide salts in water, although mixtures of water and an organic solvent such as an alcohol or other hydrophilic compound may alternatively be utilized. The flame, which may be created by combustion of a fuel such as methane or by generation of a plasma arc, has a velocity at the time of introduction of the feed solution of at least Mach 0.1. The ratio of kinetic energy per unit volume of the liquid feed stream to that of the flame ranges between 2:1 and 40:1. Preferably, the feed solution consists of a blend of aqueous solutions of an iron halide and a divalent metal halide which are injected together into the rapidly moving, turbulent, high temperature flame. The high shear and turbulence of the high velocity flame atomizes the iron and divalent metal halide feed solution into fine droplets. Preferably, the average droplet size of the atomized feed solution is less than 30 microns. Although in the preferred embodiment the feed solution is broken into fine iron and divalent metal halide solution droplets by kinetic atomization, other methods of transforming the feed solution into droplets, such as by passing the feed solution through an atomizing nozzle, may alternatively be utilized as is well known to those skilled in the art.

Subsequent to the introduction of the iron and divalent metal halide feed solution into the high velocity flame, the combined mixture of the feed solution and flame 16 is held in the main reactor 18. Since the feed solution is entirely vaporized, there exists both a precursor phase consisting of the iron and divalent metal halide salt vapor as well as an oxidizing or hydrolyzing vapor consisting of the flame and the vaporized feed solution solvent. While in the reactor, the vaporized iron and divalent metal salt reacts with the oxidizing or hydrolyzing vapor and converts to a metal oxide vapor phase. This oxide vapor phase is way beyond equilibrium vapor pressure and therefore solid particles of divalent metal doped magnetite precipitate therefrom.

To ensure that the oxide particles precipitated within the reactor are magnetic iron oxide rather than non-magnetic alpha ferric oxide, two reactor parameters are carefully controlled: temperature and oxygen partial pressure.

The reactor temperature must be hot enough to ensure both that the divalent metal halide salts held in the reactor will remain completely vaporized and that the formation of alpha ferric oxide will be avoided when the oxide particles precipitate from the vapor phase. Conversely, the reactor temperature must be below the melting point of iron oxide to ensure the complete precipitation of the desired magnetite particles. Hence, in the preferred embodiment, the lower temperature limit of the main reactor is 1000° C. which is sufficient to maintain vaporization of the divalent metal halide salt as well as to avoid formation of alpha ferric oxide while the higher temperature limit of the reactor is less than 1600° C. which is just below the melting point of iron oxide.

The oxygen partial pressure is selected to ensure that the iron and divalent metal halide vapor converts to iron and divalent metal oxide particles of the proper valence and crystal form which, in the preferred embodiment, is spinel $Fe_3O_4$ (magnetite). The oxygen partial pressure and reactor temperature regime where divalent metal doped magnetite is the preferred phase is at a partial pressure of oxygen between 1 and $10^{-16}$ atmospheres and at a reactor temperature between 1000° C. and 1600° C. Of course, the exact combinations of partial pressure and reactor temperature which will promote precipitation of the spinel magnetite particles will vary according to the composition of the divalent metal dopant selected and the extent of its mole percent substitution for the ferric halide of the feed solution. Regardless of the dopant selected, however, the particles which precipitate from the vapor phase will have the desired spinel $Fe_3O_4$ crystallographic structure if the oxygen partial pressure and reactor temperature falls within that range between 1 and $10^{-16}$ atmospheres and between 1000° C. and 1600° C. where the formation of alpha ferric oxide is avoided while the formation of spinal magnetite is preferred.

Figure 2:
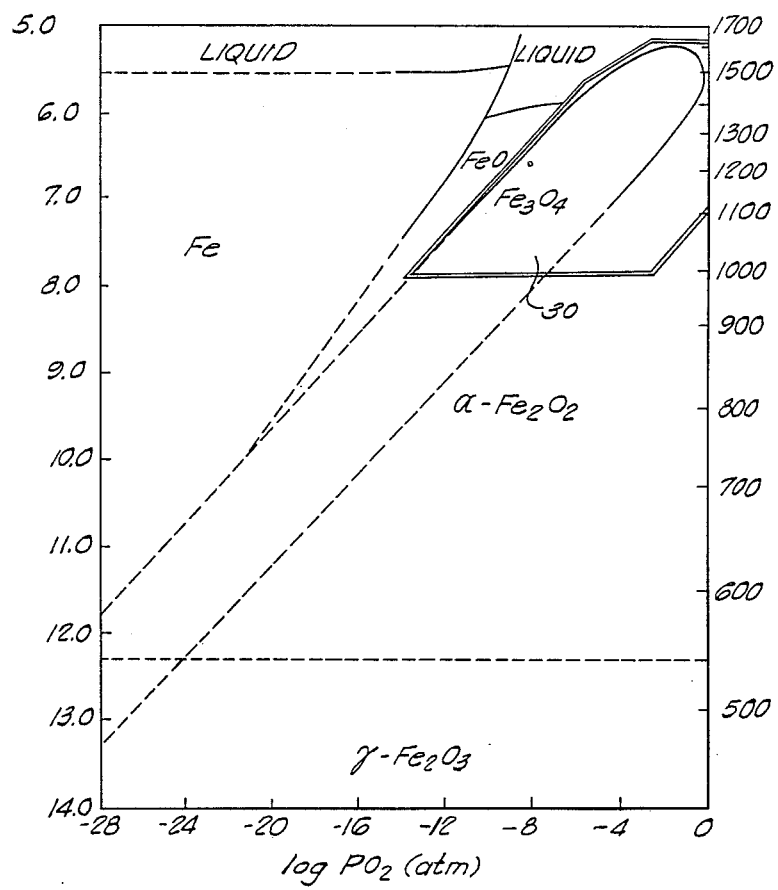
FIG. 2 is an extrapolated iron phase diagram which illustrates the range of temperatures and partial pressures of the hydrolyzing or oxidizing gases in which the vaporized feed solution may be held in the high temperature reactor in order to precipitate cobalt doped particles having a magnetite crystal structure according to the formula $Co_{0.25}Fe_{2.75}O_4$.

When cobalt is the divalent metal dopant, the regime 30 where doped magnetite, having the formula $Co_{0.25}Fe_{2.75}O_4$, is the preferred phase is illustrated in FIG. 2. In this embodiment, the entire vapor phase is maintained within the reactor at a partial pressure of oxygen between 1 and $10^{-16}$ atmospheres and at a reactor temperature of between 1000° C. and 1600° C., as further limited by the boundaries of Zone 30, to ensure that cobalt doped magnetite rather than doped alpha ferric oxide is precipitated from the vapor phase. Of course, the exact boundaries of Zone 30 will vary depending upon the extent of cobalt's mole percent substitution for the ferric ion. Regardless of the extent of the dopant utilized, the preferred combination of oxygen partial pressure and reactor temperature will still be universally defined by that combination of partial pressure of the oxidizing phase and reactor temperature which is below the melting point of iron oxide and which s sufficient to effect formation of spinel magnetite yet avoid formation of alpha ferric oxide. Hence, by maintaining the vapor phase in the reactor at a partial pressure of the oxidizing phase and at a reactor temperature ranging between 1 and $10^{-16}$ atmospheres and between 1000° C. and 1600° C., respectively, which is sufficient to effect formation of particles having the magnetite structure yet avoid the formation of alpha ferric oxide, it is ensured that cobalt doped spinel magnetite having the general formula $Co_{0.25}Fe_{2.75}O_4$ will be formed upon precipitation rather than an undesirable non-magnetic phase.

In alternative embodiments, when simply magnetite or maghemite is desired rather than doped magnetite or maghemite, a different regime defines the combinations of partial pressure of the oxidizing phase and reactor temperature at which precipitation of magnetite particles from the vapor phase is favored and precipitation of alpha ferric oxide is not. As illustrated in FIG. 3, magnetite is the preferred phase to which the iron halides will convert when the partial pressure of the oxidizing phase is between 1 and $10^{-16}$ atmospheres and the reactor temperature is between 1000° C. and 1600° C., as defined by the boundaries of Zone 40. Of course, Zone 40 merely represents those combinations of oxygen partial pressure and reactor temperatures which are sufficient to effect formation of magnetite yet avoid formation of alpha ferric oxide. Hence, the preferred oxygen partial pressure and reactor temperature when simple magnetite and maghemite is desired, is that range between 1 and $10^{-16}$ atmospheres and between 1000° C. and 1600° C. sufficient to effect the formation of spinel magnetite yet avoid the formation of alpha ferric oxide.

In another alternative embodiment, when magnetite or doped magnetite is the desired product, ferrous oxide rather than spinel magnetite may be selected as the iron oxide crystal structure which the iron or iron and divalent metal particles will take when they precipitate from the vapor phase. As in earlier embodiments, an atomized iron halide or an iron and divalent metal halide feed solution is held in a reactor where the droplets evaporate and the vaporized metal salts convert to oxides and precipitate as fine oxide particles. In this case, however, the iron and divalent metal halide vapors and oxidizing vapors are held in the reactor at a regime where ferrous oxide rather than magnetite is the preferred crystal phase. Thus, the preferred partial pressure of the oxidizing phase and reactor temperature for this embodiment is that range which is sufficient to effect formation of ferrous oxide yet avoid formation of alpha ferric oxide, as defined by Zone 50 in FIG. 4.

For each of the embodiments, the final particle size of the doped magnetite and maghemite particles may be controlled by variation of both the concentration of iron oxide particles per unit volume of the vapor phase and the residence time of the vapor in the reactor. As the magnetite particles precipitate from the vapor phase, they randomly collide and coalesce with surrounding particles. Consequently, the longer the magnetite particles remain in the reactor, the larger is the size of the magnetite particles produced. Control of the doped magnetite or maghemite particle's growth is particularly important since particle size significantly affects the coercivity of each individual particle. If the oxide particles are too small, the phenomena of superparamagnetism will occur, adversely reducing the oxide particles' coercivity. Conversely, if the doped oxides are too large, the phenomena of magnetic domains will take place likewise reducing coercivity. The pitfalls of superparamagnetism and magnetic domains are avoided when the doped oxides have an average particle size between 0.02 and 0.2 microns. Magnetite and maghemite particles having this optimal particle size are achieved when the feed solution vapor resides in the reactor for between 5 and 200 milliseconds.

The final step in the process of producing the desired magnetite or maghemite particles is the quenching of the oxide particles which have precipitated from the vapor phase. When gamma $Fe_2O_3$ (maghemite) is the desired product, the iron oxide particles are quenched to a temperature where maghemite is metastable. The temperature below which maghemite will not convert to alpha ferric oxide is dependent to some extent upon the divalent metal ion concentration of the magnetite particle. When the mole ratio of divalent metal ion to iron is significantly smaller than 1 to 2, the optimum temperature range for preventing the formation of alpha ferric oxide is less than 500° C. Hence, to prevent contamination of the quenched particles by the non-magnetic phase, the quenching process must not only reduce the oxides temperature to below 500° C. but must also minimize the time during which the iron oxide particles are exposed to processing conditions where formation of alpha ferric oxide is favored rather than maghemite. Consequently, the cooling rates required when quenching the precipitated particles in order to avoid formation of the alpha phase are in excess of 1000° C. per second, and preferably in excess of 10,000° C. per second.

To produce maghemite, quenching is preferably accomplished by introducing the oxide particles to an atomized spray 20 of water or liquid nitrogen. If gaseous air or nitrogen is alternatively selected as the quenching medium, extremely efficient mixing with the magnetite particles must ensue to ensure the necessary rapid cooling. When the desired product is magnetite, the quenching process must be limited to a reducing atmosphere in order to prevent the transformation of the precipitated magnetite particles to maghemite. Under these circumstances, the reactor atmosphere is preferably oxygen deficient and the quenching fluid must assume an even lower oxygen partial pressure. Preferably, water and nitrogen mixed with hydrogen is utilized as the quenching medium to ensure that the magnetite particles precipitated from the vapor phase do not oxidize. The stability of the magnetite phase is further ensured by prohibiting the exposure of the quenched particles to an oxidizing atmosphere until the magnetite particles are cooled to a temperature below 200° C.

Although spinel magnetite is the preferred crystal phase, an alternative crystal structure can be precipitated when magnetite or doped magnetite is the desired final product. In this alternative embodiment, the vapor phase is held in the main reactor at a reactor temperature and a partial pressure of the oxidizing phase which is sufficient to effect the formation of ferrous oxide yet avoid the formation of alpha ferric oxide or magnetite. In this embodiment, the particles which precipitate from the vapor phase are ferrous oxide particles rather than magnetite particles which, when quenched in a neutral fluid such as nitrogen or water, transform into unaggregated, equiaxed particles of magnetite. Preferably, the ferrous oxide particles are quenched to temperatures below 500° C. at an enhanced rate, in excess of 1000° C. per second. If the vapor phase temperature and oxygen partial pressure are such that ferrous oxide is formed and the quench fluid is neutral or reducing, the transformation of ferrous oxide to alpha ferric oxide can be completely avoided. Under these conditions, the importance of a rapid quench is lessened.

In order to further illustrate the invention, the following example is provided. It is to be understood, however, that this example is included for illustrative purposes only and is not intended to limit the scope of the invention as set forth in the accompanying claims.

EXAMPLE

Magnetic oxide powder, consisting of cobalt-modified gamma iron oxide, was prepared by hydropyrolysis of an aqueous solution of ferric chloride and cobalt chloride. The feed solution was prepared by blending prepared aqueous solutions of the pure metal salts to obtain a final solution containing 12.75 weight percent iron and 0.54 weight percent cobalt. The feed solution was injected into a high-velocity flame at the rate of 9.08 g/s through an orifice. The resulting coherent liquid jet had a velocity of 31.8 m/s and a kinetic energy per unit volume of 0.71 MJ/m3.

The high-velocity flame was obtained by combusting 3.86 g/s of natural gas (with an average heat of formation of $-4350.7$ J/g), 16.85 g/s of oxygen, and 3.46 g/s of nitrogen in a watercooled burner. The flame was brought to a velocity calculated to be 862.9 m/s at the point of liquid injection. The gas stream at this point was calculated to have a Mach number of 0.84 and a kinetic energy per unit volume of 0.052 MJ/m3. The combined mass of the flame and liquid feed was then introduced into a refractory-lined reactor. The calculated temperature and partial pressure of oxygen of the mixed and equilibrated stream was 1856 K and 3.3 KPa respectively. The residence time of the process gas in the reactor was calculated to be 29.5 ms. The temperature of the process stream was rapidly reduced by spraying water into the stream at a rate of 22.8 g/s and adding air at the rate of 43 g/s to obtain a post-quench temperature of 683 K.

The as-made product had a specific surface area, measured by nitrogen adsorption, of 18.3 m2/g equivalent to a particle diameter of 0.06 microns. A vibrating sample magnetometer was used to measure the magnetic properties which were, at a maximum applied field of 10,000 Oe; coercivity, 715 Oe; saturation magnetization, 63.9 e.m.u./g; remanence, 37.83 e.m.u./g.

It is understood that the preceeding description is given merely by way of illustration and not in limitation of the invention and that various modifications may be made thereto without departing from the spirit of the invention as claimed.

What is claimed is:

1. A method for producing unaggregated, magnetic iron oxide particles in a high temperature reactor, the unaggregated, magnetic iron oxide particles having a spinel crystal structure, said method comprising:

evaporating droplets of a feed solution, selected from the group consisting of an iron halide feed solution and an iron and divalent metal halide feed solution, to form a vapor phase comprising a precursor phase and a hydrolyzing or oxidizing phase;

maintaining the vaporized feed solution in a reactor at an oxygen partial pressure and at a reactor temperature sufficient to maintain both evaporation of the feed solution and formation of particles having a spinel magnetite crystal structure yet avoid formation of alpha ferric oxide, wherein the oxygen partial pressure is between 1 and $10^{-16}$ atmospheres and the reactor temperature is between 1000° C. and 1600° C., wherein unaggregated, magnetic iron oxide particles having the spinel magnetite crystal structure precipitate from the vapor phase; and quenching the unaggregated, magnetic iron oxide particles precipitated from the vapor phase to a temperature less than 500° C.

2. The method as recited in claim 1 wherein the feed solution droplets of the evaporating step are formed by passing the feed solution through an atomizing nozzle.

3. The method as recited in claim 1 wherein the feed solution droplets of the evaporating step are formed by kinetically atomizing the feed solution with a flame.

4. The method as recited in claim 3 wherein the flame has a velocity greater than Mach 0.1 and the feed solution has a kinetic energy per unit volume ratio ranging between 2 and 40:1 as compared to the flame.

5. The method as recited in claim 1 wherein the feed solution droplets have an average droplet size of less than 30 microns.

6. The method as recited in claim 1 wherein the residence time of the vapor phase in the reactor is between 5 and 200 milliseconds.

7. The method as recited in claim 1 wherein the step includes quenching the unaggregated, magnetic iron oxide particles precipitated from the vapor phase in a reducing atmosphere.

8. The method as recited in claim 1 wherein the quenching step includes quenching the unaggregated, magnetic iron oxide particles precipitated from the vapor phase in an oxidizing atmosphere.

9. The method as recited in claim 7 wherein the quenching step further comprises holding the quenched unaggregated, magnetic iron oxide particles in the reducing atmosphere until the quenched unaggregated, magnetic iron oxide particles have cooled to a temperature below 200° C.

10. The method as recited in claim 1 wherein the unaggregated, magnetic iron oxide particles precipitated from the vapor phase are quenched to a temperature less than 500° C. during said quenching step at a rate greater than 1000° C. per second.

11. A method for producing unaggregated, magnetic iron oxide particles in a high temperature reactor, the unaggregated, magnetic iron oxide particles having a spinel crystal structure, said method comprising:

evaporating fine droplets of a feed solution, selected from the group consisting of an iron halide feed solution and an iron and divalent metal halide feed solution, to form a vapor phase comprising a precursor phase and an oxidizing or hydrolyzing phase;

maintaining the vaporized feed solution in a reactor at an oxygen partial pressure and at a reactor temperature sufficient to maintain both evaporation of the feed solution and formation of particles having a ferrous oxide crystal structure yet avoid formation of alpha ferric oxide, wherein the oxygen partial pressure is between $10^{-4}$ and $10^{-16}$ atmospheres and the reactor temperature is between 1000° C. and 1400° C., wherein unaggregated, magnetic iron oxide particles having the ferrous oxide crystal structure precipitate from the vapor phase; and quenching the unaggregated, magnetic iron oxide particles precipitated from the vapor phase to a temperature less than 500° C.

12. The method as recited in claim 11 wherein the feed solution droplets of the evaporating step are formed by passing the feed solution through an atomizing nozzle.

13. The method as recited in claim 11 wherein the feed solution droplets of the evaporating step are formed by kinetically atomizing the feed solution with a flame.

14. The method as recited in claim 13 wherein the flame has a velocity greater than Mach 0.1 and the feed solution has a kinetic energy per unit volume ratio ranging between 2 and 40:1 as compared to the flame.

15. The method as recited in claim 11 wherein the feed solution droplets have an average droplet size of less than 30 microns.

16. The method as recited in claim 11 wherein the residence time of the vapor phase in the reactor is between 5 and 200 milliseconds.

17. The method as recited in claim 11 wherein the quenching step includes quenching the unaggregated, magnetic iron oxide particles precipitated from the vapor phase in a non-oxidizing atmosphere.

18. The method as recited in claim 11 wherein the unaggregated, magnetic iron oxide particles precipitated from the vapor phase are quenched to a temperature less than 500° C. during said quenching step at a rate greater than 1000° C. per second.

* * * * *